(12) United States Patent
Joudrey et al.

(10) Patent No.: US 10,751,642 B2
(45) Date of Patent: Aug. 25, 2020

(54) SELECT VALVE FOR LIQUID CHROMATOGRAPHY

(71) Applicant: Waters Technologies Corporation, Milford, MA (US)

(72) Inventors: Kurt D. Joudrey, Chelmsford, MA (US); Maruth Sok, Providence, RI (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 899 days.

(21) Appl. No.: 14/359,396

(22) PCT Filed: Dec. 7, 2012

(86) PCT No.: PCT/US2012/068383
§ 371 (c)(1),
(2) Date: May 20, 2014

(87) PCT Pub. No.: WO2013/086281
PCT Pub. Date: Jun. 13, 2013

(65) Prior Publication Data
US 2014/0326664 A1 Nov. 6, 2014

Related U.S. Application Data

(60) Provisional application No. 61/568,788, filed on Dec. 9, 2011.

(51) Int. Cl.
*B01D 15/14* (2006.01)
*F04B 49/22* (2006.01)
(Continued)

(52) U.S. Cl.
CPC ............. *B01D 15/14* (2013.01); *F04B 49/22* (2013.01); *F16K 11/02* (2013.01); *G01N 30/02* (2013.01);
(Continued)

(58) Field of Classification Search
None
See application file for complete search history.

(56) References Cited

U.S. PATENT DOCUMENTS 4,116,046 A 9/1978 Stein
4,169,486 A 10/1979 Otteman et al.
(Continued)

FOREIGN PATENT DOCUMENTS

JP 06170111 A 6/1994
JP 2011525594 A 9/2011
WO 2010051005 A2 5/2010

OTHER PUBLICATIONS

Unger, K.K., Roumeliotis. On-line High-Pressuer Extraction High-Performance Liquid Chromatography. Journal of Chromatography. 282 (1983) 519, 526.*

(Continued)

*Primary Examiner* — Kara M Peo
(74) *Attorney, Agent, or Firm* — Schmeiser, Olsen & Watts LLP

(57) ABSTRACT

A liquid chromatography system includes a pumping system with a selector valve in fluidic communication with a pump inlet. The selector valve switches between a first position, in which the selector valve fluidically couples a solvent reservoir to the pump inlet, and a second position, in which the selector valve fluidically couples a pressurized source of liquefied carbon dioxide (for example) to the pump inlet. The liquid chromatography system can perform as a HPLC system (or as an UPLC system) when the selector valve is in the first position and as a $CO_2$-based chromatography system when the selector valve is in the second position. The selector valve can have a third position in which both the fluidic pathway between the solvent reservoir and the pump inlet and the fluidic pathway between the pressurized source (Continued)

and the pump inlet are blocked. This shut-off position advantageously facilitates system maintenance.

5 Claims, 4 Drawing Sheets

(51) Int. Cl.
| | | |
|---|---|---|
| *G01N 30/20* | (2006.01) | |
| *B01D 15/40* | (2006.01) | |
| *G01N 30/32* | (2006.01) | |
| *F16K 11/02* | (2006.01) | |
| *G01N 30/02* | (2006.01) | |
| *G01N 30/34* | (2006.01) | |

(52) U.S. Cl.
CPC .............. *G01N 30/20* (2013.01); *G01N 30/32* (2013.01); *B01D 15/40* (2013.01); *G01N 30/34* (2013.01); *G01N 2030/027* (2013.01); *Y10T 137/85986* (2015.04); *Y10T 137/86517* (2015.04)

(56) References Cited

U.S. PATENT DOCUMENTS

| | | | | |
|---|---|---|---|---|
| 5,139,681 A | * | 8/1992 | Cortes | G01N 30/463 210/198.2 |
| 5,637,208 A | | 6/1997 | Dourdeville | |
| 5,656,034 A | * | 8/1997 | Kochersperger | F04B 9/02 210/656 |
| 5,952,557 A | | 9/1999 | Ikeda et al. | |
| 6,648,609 B2 | | 11/2003 | Berger et al. | |
| 2010/0024906 A1 | | 2/2010 | Moeller et al. | |
| 2010/0040483 A1 | | 2/2010 | Berger et al. | |

OTHER PUBLICATIONS

Supplemental Search Report in related European Patent Application No. 12856225.3, dated Aug. 3, 2015; 7 pages.
Villeneuve, Manon S. and Robert J. Anderegg, "Analytical supercritical fluid chromatography using fully automated column and modifier selection valves for the rapid development of chiral separations", Journal of Chromatography A, 1998, pp. 217-225, vol. 826, No. 2, Elsevier Publishers.
International Preliminary Report on Patentability in counterpart international patent application No. PCT/US12/66383, dated Jun. 19, 2014.
International Search Report & Written Opinion in International Patent Application No. PCT/US12/68383, dated Feb. 5, 2013; 7 pages.
Notice of Rejection in counterpart Japanese patent application No. 2014-546108, dated Oct. 18, 2016; 5 pages.
Examination Report in European Patent Application No. 12856225.3 dated Jun. 19, 2019; 4 pages.

* cited by examiner

SELECT VALVE FOR LIQUID CHROMATOGRAPHY

RELATED APPLICATION

This application claims the benefit of and priority to U.S. provisional application No. 61/568,788, filed Dec. 9, 2011, titled "Select Valve for Liquid Chromatography Systems," the entirety of which application is incorporated by reference herein.

FIELD OF THE INVENTION

The invention relates generally to liquid chromatography systems. More specifically, the invention relates to liquid chromatography systems capable of switching between carbon dioxide ($CO_2$)-based chromatography and high-performance liquid chromatography (HPLC) or between $CO_2$-based chromatography and ultra-performance liquid chromatography (UPLC).

BACKGROUND

Chromatography is a set of techniques for separating a mixture into its constituents. For instance, in a liquid chromatography (LC) application, a solvent delivery system takes in a mixture of liquid solvents and delivers the mixture to an autosampler (also called an injection system or sample manager), where an injected sample awaits the arrival of this mobile phase. The mobile phase with the dissolved injected sample passes to a column. By passing the mixture through the column, the various components in the sample separate from each other at different rates and thus elute from the column at different times. A detector receives the separated components from the column and produces an output from which the identity and quantity of the analytes may be determined.

Well-established separation technologies include HPLC (High Performance Liquid Chromatography), UPLC (Ultra Performance Liquid Chromatography), and $CO_2$-based chromatography, such as SFC (Supercritical Fluid Chromatography), gas chromatography (GC), and solvating gas chromatography (SGC). HPLC systems use high pressure, ranging traditionally between 1,000 psi (pounds per square inch) to approximately 6,000 psi, to generate the flow required for liquid chromatography in packed columns. In contrast to HPLC, UPLC systems use columns with smaller particulate matter and higher pressures approaching 20,000 psi to deliver the mobile phase. SFC, GC, and SGC systems use highly compressible mobile phases, which typically employ $CO_2$ as a principle component. To ensure that the $CO_2$ component remains liquid, the CO2 is at elevated pressure and reduced temperature. Because a single pump of the $CO_2$-based system is dedicated to the intake of $CO_2$, however, liquid chromatography systems that are configured for $CO_2$-based chromatography generally cannot also be configured to perform either HPLC or UPLC, without a time and labor intensive reconfiguration of the system.

SUMMARY

In various aspects, the invention features a pump, a solvent delivery system, and a liquid chromatography system, each comprising an actuator with an inlet, and a selector valve in fluidic communication with the inlet of the actuator. The selector valve is configured to switch between a first position, in which the selector valve provides a fluidic pathway between the inlet of the actuator and a source of fluid maintained at a first pressure, and a second position, in which the selector valve provides a fluidic pathway between the inlet of the actuator and a source of pressurized fluid maintained at a pressure greater than atmospheric pressure.

In another aspect, the invention features a method for testing a liquid chromatography system. The method comprises switching a selector valve from a first position, in which the selector valve provides a fluidic pathway between an inlet of a pump and a source of pressurized fluid maintained at a pressure greater than atmospheric pressure, to a second position, in which the selector valve blocks the fluidic pathway. After blocking the fluidic pathway, pressurized fluid currently remaining in the pump is vented through a vent valve disposed at an outlet of the pump. The selector valve is switched from the second position to a third position in which the selector valve provides a fluidic pathway between the pump inlet and a source of fluid maintained at a second pressure.

In another aspect, the invention features a method for operating a liquid chromatography system. The method comprises pumping solvents maintained at a first pressure through a pair of pumps operating in parallel. A selector valve is switched from a first position, in which the selector valve provides a fluidic pathway between an inlet of one of the pumps and a source of one of the solvents, to a second position, in which the selector valve provides a fluidic pathway between the inlet of that one pump and a source of pressurized fluid maintained at a pressure greater than atmospheric pressure.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Solvent delivery systems described herein include a manually or automatically controllable selector valve with different positions for selecting between a source of pressurized fluid, for example $CO_2$, and a source of solvent, typically maintained at atmospheric pressure. The selector valve enables either source to be fluidically coupled to an inlet of a pump. This ability to switch from the pressurized fluid to the solvent enables a $CO_2$-based chromatography system, with this selector valve, to operate alternatively as an HPLC system (or as an UPLC system, depending on the system's other capabilities). Conversely, the ability to switch from the solvent to the pressurized supply of fluid enables an HPLC system (or UPLC system) with this selector valve to operate alternatively as a $CO_2$-based chromatography system. In addition, being able to switch from the pressurized fluid to the solvent enables the performance of typical diagnostics, for example, a fluid leak test. The selector valve can also have a blocked position in which no fluid supply is coupled to the pump inlet. This shut-off position advantageously facilitates system maintenance.

Figure 1:
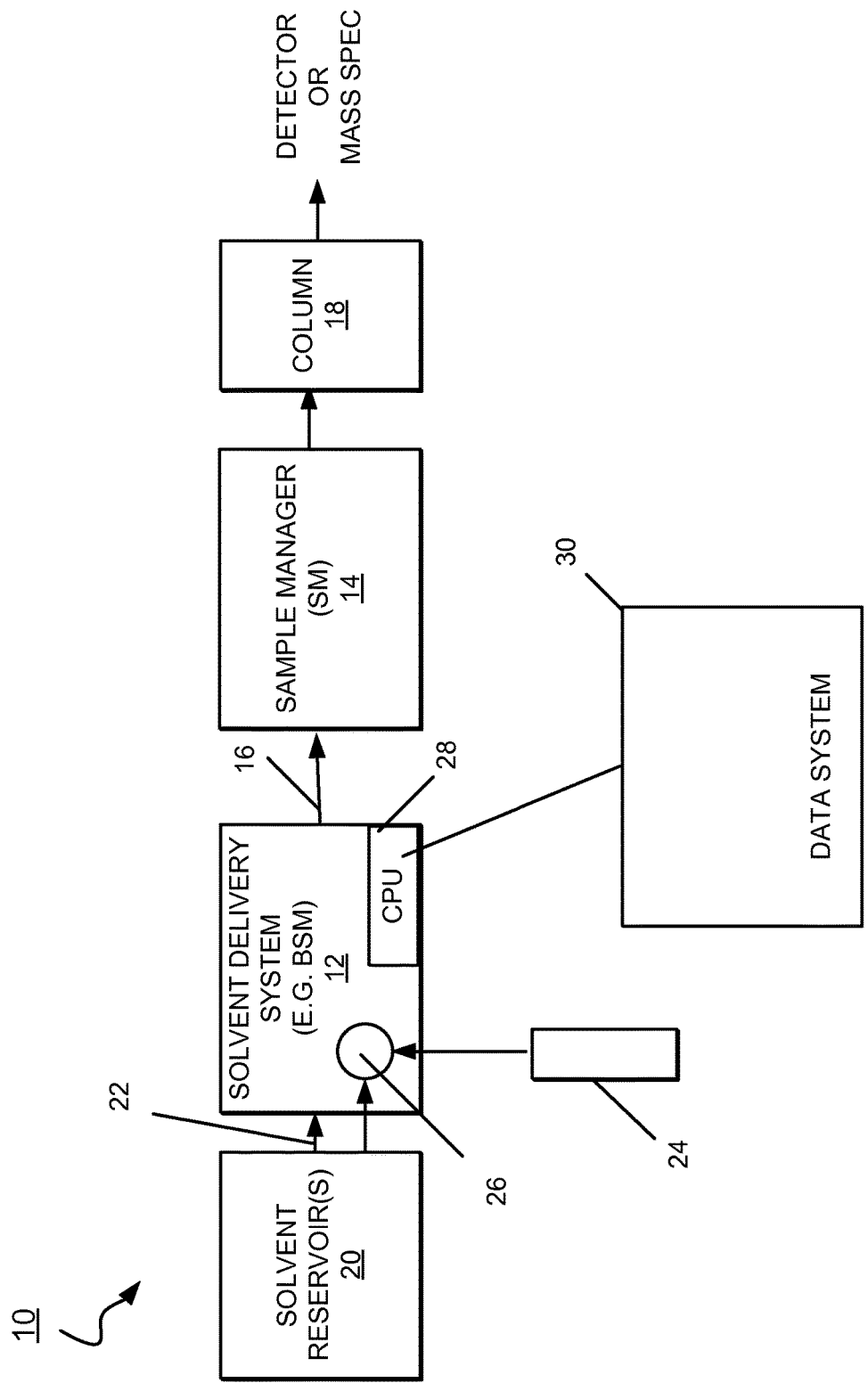
FIG. 1 is a functional block diagram of an embodiment of a liquid chromatography system.

FIG. 1 shows an embodiment of a liquid chromatography system 10 for separating a sample into its constituents. The liquid chromatography system 10 includes a solvent delivery system 12 in fluidic communication with a sample manager 14 (also called an injector or autosampler) through tubing 16. The sample manager 14 is in fluidic communication with a chromatographic column 18. A detector (not shown), for example, a mass spectrometer, can be in fluidic communication with the column 18 to receive its output.

The solvent delivery system 12 includes pumps (not shown) in fluidic communication with solvent (or fluid) reservoirs 20 from which the pumps draw solvents through tubing 22. One of the solvent reservoirs 20 and a source 24 of a highly compressible fluid, for example, $CO_2$, are fluidically coupled to the solvent delivery system 12 through a selector valve 26, as described in more detail in connection with FIG. 3. Solvents in the solvent reservoirs 20 are maintained at atmospheric pressure, whereas the highly compressible fluid from the source 24 is maintained at an elevated pressure (i.e., greater than atmospheric pressure). The selector valve 26 can be implemented with any one of a variety of types including, but not limited to, rotary shear valves, solenoid valves, pneumatic, manual or electromechanically actuated valves. Although described in the context of $CO_2$, the principles herein can apply to any chemical compound being supplied to the inlet of a pump.

In one embodiment, the solvent delivery system 12 is a binary solvent manager (hereafter, BSM 12), which uses two individual serial flow pumps to draw solvents and to deliver a solvent composition to the solvent manager 14. During operation of the BSM 12, one of the serial flow pumps draws a solvent from a solvent reservoir 20, while the other serial flow pump draws either a highly compressible fluid from the pressurized source 24 or another solvent from a second solvent reservoir 20 maintained at atmospheric pressure, depending upon the setting of the selector valve 26. The mixing of solvents occurs at high pressure after the solvents pass through the pumps. An example implementation of a BSM is the ACQUITY UPLC Binary Solvent Manager, manufactured by Waters Corp. of Milford, Mass.

The BSM 12 can further include a processor 28 that is in communication with a processor-based data system 30. From the data system 30, the processor 28 of the solvent delivery system 12 can be programmed to switch the selector valve 26 automatically, in accordance with a predetermined procedure that ensures safety when switching between the $CO_2$ source 24 at an elevated pressure and a solvent 20 at the same or at a different pressure, for example, atmospheric pressure.

Figure 2A:
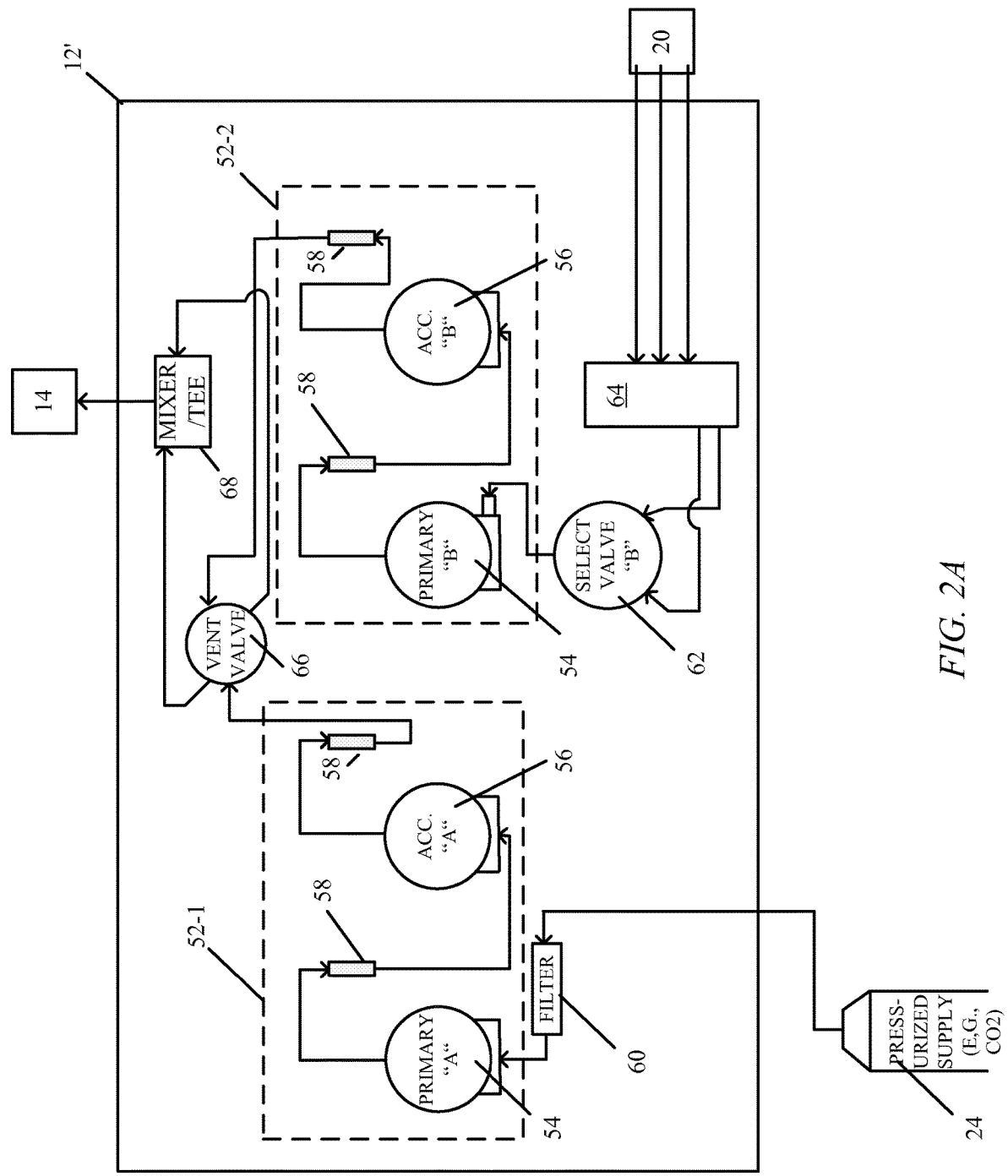
FIG. 2A and FIG. 2B are block diagrams of an embodiment of a conventional binary solvent manager; the conventional binary configured in FIG. 2A for SFC and alternately configured in FIG. 2B for UPLC or HPLC.
Figure 2B:
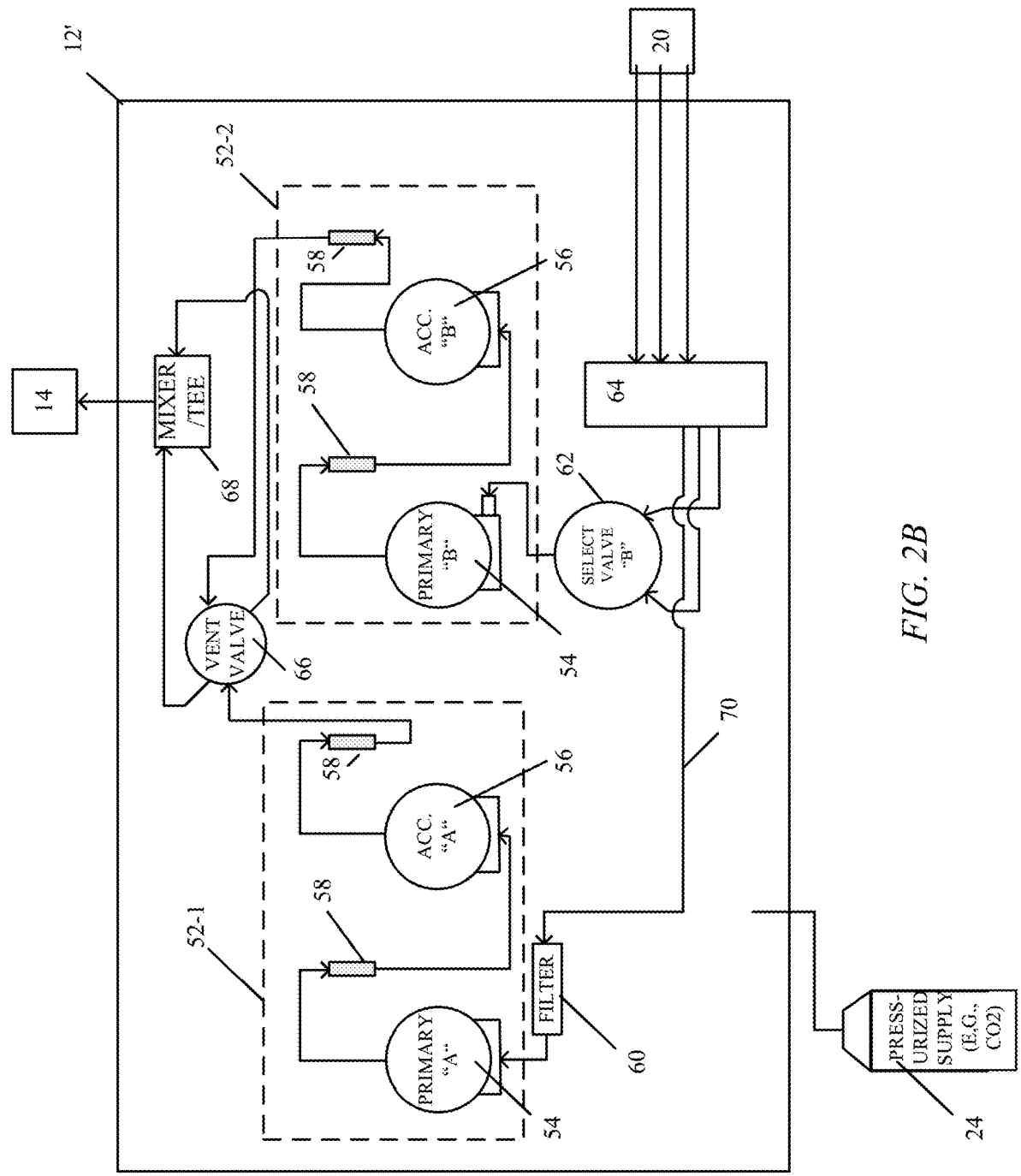

FIG. 2A and FIG. 2B each shows a conventional embodiment of a BSM 12', which lacks the selector valve 26 of FIG. 1. The BSM 12' includes two pumps 52-1 and 52-2 (generally, 52), respectively referred to as pump A and pump B. Each pump 52-1, 52-2 includes a primary actuator 54 and an accumulator actuator 56 coupled in series; the solvent composition stream leaving the primary actuator 54 passes through a pressure transducer 58 to the inlet of the accumulator actuator 56.

The inlet check valve of the primary actuator 54 of the pump A 52-1 is fluidically coupled through a filter 60 to the source 24 of $CO_2$, which is under high pressure to maintain the chemical compound at saturation point or in the liquid state. The inlet check valve of the primary actuator 54 of the pump B 52-2 is at low pressure, where fluid intake from a solvent reservoir 20 occurs at atmospheric pressure during the pump cycle. A solvent select valve 62, coupled to a degasser 64, is configured to select the particular solvent that passes to the inlet of the primary actuator 54 of the pump B 52-2.

Each of the accumulator actuators 56 is at high pressure, maintaining the fluid received from its respective primary actuator 54 at system pressure during the intake and transfer operations performed by the primary actuator. In brief overview, while each primary actuator 54 intakes fluid (e.g., from the pressurized $CO_2$ source 24 or a solvent source 20), each accumulator actuator 56 delivers fluid at system pressure to a vent valve 66, and while each primary actuator 54 transfers fluid, the accumulator actuator 56 receives and holds the fluid at system pressure for the next delivery cycle. The high-pressure flows delivered by the accumulator actuators 56 pass through the vent valve 66 and combine at a flow-combining device 68, such as a T-section or a mixer. The solvent composition resulting from the combined flows is delivered over time to the sample manager 14.

FIG. 2B shows the BSM 12' with the source 24 of $CO_2$ physically disconnected from the intake side of the filter 60, and replaced with a fluidic connection 70 to a solvent reservoir 20 through the degasser 64. This reconfiguration enables the BSM 12' to operate as an HPLC system (or as a UPLC system, depending upon the base configuration of the system). However, the reconfiguration involves disconnecting the pressurized $CO_2$ source 24 and changing the various fittings, a manually intensive process requiring considerable system downtime and posing risks to the system and to personnel if done incorrectly.

Figure 3:
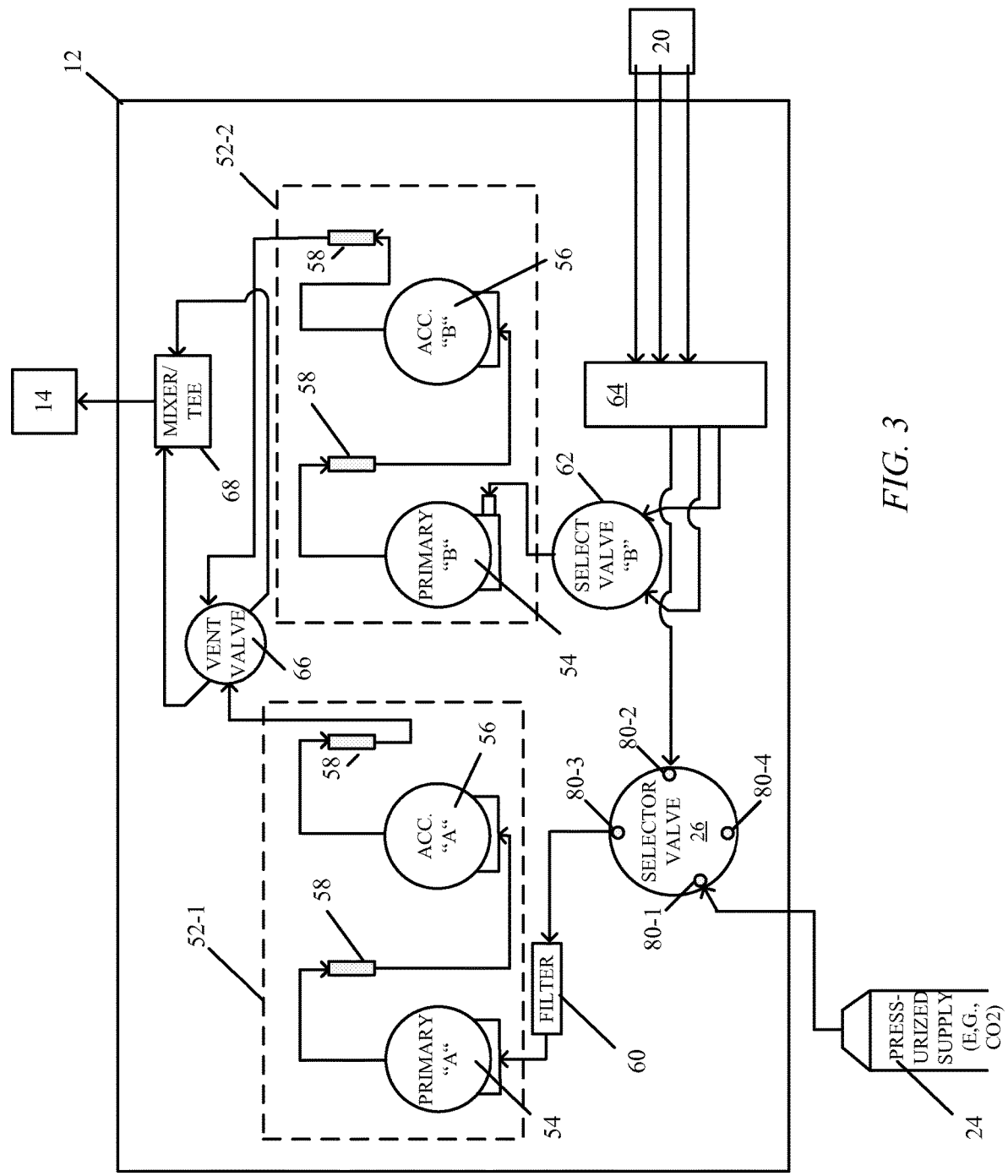
FIG. 3 is a block diagram of another embodiment of a binary solvent manager configured with a selector valve capable of switching between a solvent source maintained at atmospheric pressure and a second solvent source maintained at greater than atmospheric pressure.

FIG. 3 shows an embodiment of the BSM 12 of FIG. 1, configured to include the selector valve 26. This embodiment resembles the BSM 12' of FIG. 2A and FIG. 2B, modified to include the selector valve 26. The pumps 52, primary actuators 54, accumulator actuators 56, transducers 58, filter 60, solvent select valve 62, degasser 64, vent valve 66, and mixer 68 of the BSM 12 are unchanged from the corresponding components of the BSM 12' of FIG. 2A and FIG. 2B.

The selector valve 26 has a plurality of ports and positions. One port 80-1 is fluidically coupled to the pressurized source 24 of $CO_2$. Another port 80-2 is fluidically coupled to an output of the degasser 64, to receive therefrom a solvent from one of the solvent reservoirs 20. A third (output) port 80-3 is fluidically coupled to the intake side of the filter 60. An optional fourth port 80-4 is a blocked port. The selector valve 26 can have other ports than those shown, such as a vent port and one or more ports coupled to receive other solvents.

A first position of the selector valve 26 produces an open fluidic pathway between the source 24 of $CO_2$, coupled to port 80-1, and the intake side of the filter 60. In this first position, the BSM 12 is configured as a $CO_2$-based chromatography system, with the pump A 52-1 receiving $CO_2$. In addition, the connection to the degasser 64 is blocked; that is, there is no open fluidic pathway between the port 80-2 of the selector valve 26 and the intake side of the filter 60. The other pump B 52-2 receives a solvent from a solvent reservoir 20.

A second position of the selector valve 26 produces an open fluidic pathway between the degasser 64, coupled to port 80-2, and the intake side of the filter 60. In this second position, both pumps 52-1, 52-2 receive a solvent from the solvent reservoirs 20. In addition, the pressurized source 24 of $CO_2$ is blocked; that is, there is no open fluidic pathway between the port 80-1 and the intake side of the filter 60. The second position can also serve as a configuration in which to perform a leak test, without having to change any fittings. The BSM 12 can operate as an HPLC system or as a UPLC system, depending upon the particular configuration of the system.

A third position, referred to as a blocked position, has no fluidic pathway between the output port 80-3 and either the pressurized source 24 of $CO_2$ or the degasser 64. The blocking of fluidic pathways can occur at the output port 80-3, at both input ports 80-1 and 80-2, or at all three ports 80-1, 80-2, 80-3. The blocked position advantageously facilitates system maintenance by virtue of having no leaking solvents when removing tubing, valves, pump heads, etc.

This blocking also facilitates switching from the pressurized source 24 to a solvent source 20 maintained at a different pressure, for example, atmospheric pressure. To make the switch, the selector valve 26 can be switched from the first position, in which there is a fluidic pathway between the inlet of a pump 52 and the pressurized source 24, to the third position, in which the selector valve 26 blocks this fluidic pathway. After the fluidic pathway is blocked, the pressurized fluid currently remaining in the pump vents through the vent valve 66 disposed at an outlet of the pump 52, thus controllable releasing the pressure. After the venting, the selector valve 26 can be switched from the third position to the second position in which the selector valve 26 provides a fluidic pathway between the pump inlet and a source 20 of fluid maintained at the different pressure.

Switching the selector valve 26 from one position to another can occur automatically or manually, depending upon the particular implementation of the BSM 12. For manual switching, the BSM 12 can have an external dial connected to the selector valve 26, for rotating the selector valve 26 into its desired position. For automated switching, the BSM 12 has programmatically controllable electronics (e.g., CPU 28) connected to the selector valve 26 for turning the selector valve into its desired position (e.g., in response to a user-issued command submitted through a computer data station 30). Automated switching is preferred over manual switching because automated switching is less prone to operator error. For example, a possible shortcoming with a manually operated selector valve is the risk of a direct change from the $CO_2$ (at tank pressure) to fluid (e.g., at atmospheric pressure). The resulting instantaneous expansion of the $CO_2$ could have damaging effects on the system. An automated selector valve can be controlled to prevent this situation.

An automated selector valve also provides advantages for system start-up. Usually, when starting a pump 52, the pump auto-zeros the pressure transducers 58. If the pump 52-1, for example, starts running while connected to the source 24 of $CO_2$, the transducers 58 auto-zero with the tank pressure of the pressurized source 24. The pump 52-1 then subsequently uses an offset equal to this tank pressure. The other pump 52-2, being connected to a solvent at, for example, atmospheric pressure, produces a different offset. This difference in pump offsets can decrease performance significantly. The selector valve 26 enables the first pump 52-1 to make a connection to a solvent reservoir at atmospheric pressure, which results in a comparable offsets for the two pumps 52-1, 52-2.

While the invention has been shown and described with reference to specific preferred embodiments, it should be understood by those skilled in the art that various changes in form and detail may be made therein without departing from the spirit and scope of the invention as defined by the following claims. For example, although shown in FIG. 3 to be coupled to the pump A 52-1, the selector valve 26 can instead be connected to the primary actuator 54 of the second pump B 52-2 with the solvent select valve 62 instead connected to the inlet of the first pump A 52-1, without departing from the principles described herein. In addition, other embodiments of the BSM 12 can have two selector valves 26, one selector valve being connected to the inlet of each pump 52-1, 52-2, each selector valve providing a switchable connection between a fluid maintained at elevated pressure and a fluid maintained at the same elevated pressure or at a different pressure, for example, atmospheric (or room) pressure.

What is claimed is:

1. A chromatography system, comprising:
   a solvent delivery system comprising:
      a pumping system including an actuator with an inlet; and
      a selector valve in fluidic communication with the inlet of the actuator, the selector valve being configured to switch between a first position, in which the selector valve provides a fluidic pathway between the inlet of the actuator and a source of fluid maintained at a first pressure, and a second position, in which the selector valve provides a fluidic pathway between the inlet of the actuator and a source of pressurized fluid maintained at a pressure greater than atmospheric pressure, wherein the chromatography system is a CO2-based chromatography system when the selector valve is in the second position and is a liquid chromatography system when the selector valve is in the first position and the selector valve has a third position wherein both the fluidic pathway between the inlet of the actuator and the source of fluid maintained at the first pressure and the fluidic pathway between the inlet of the actuator and the source of pressurized fluid are blocked.

2. The liquid chromatography system of claim 1, wherein the pressurized fluid is carbon dioxide.

3. The liquid chromatography system of claim 1, wherein the pumping system includes two independent serial flow pumps, each serial flow pump including a primary actuator connected in series with an accumulator actuator, and wherein the actuator is the primary actuator and the inlet of the actuator is an inlet to the primary actuator of one of the two serial flow pumps.

4. A chromatography system operable as a liquid chromatography system and alternatively operable as a CO2-based chromatography system via a selector valve, the chromatography system comprising:
   a solvent delivery system comprising:
      a pumping system including a first pump having a first primary actuator with a first inlet and a first accumulator actuator coupled in series; and a second pump having a second primary actuator with a second inlet and a second accumulator actuator coupled in series; and
      a solvent select valve fluidically coupled to a solvent reservoir and the second inlet of the second primary actuator;
   wherein the selector valve comprises:
      a first port fluidically coupled to a pressurized CO2 source, a second port fluidically coupled to the solvent reservoir, and a third port fluidically coupled to the first inlet of the first primary actuator;

a first position producing fluidic pathways between the first port and the third port and between the pressurized CO2 source and the first inlet of the first primary actuator, and blocking the second port;

a second position producing fluidic pathways between the second port and the third port and between the solvent reservoir and the first inlet of the first primary actuator, and blocking the first port;

a third position wherein the fluidic pathways between the first port and the third port, between the pressurized CO2 source and the first inlet of the first primary actuator between the second port and the third port, and between the solvent reservoir and the first inlet of the first primary actuator, are blocked; and wherein the selector valve is configured to switch between the first, second, and third positions and wherein the chromatography system is a CO2-based chromatography system when the selector valve is in the first position and is a liquid chromatography system when the selector valve is in the second position.

5. The chromatography system of claim 4, wherein the third position of the selector valve facilitates maintenance of the chromatography system and switching from the liquid chromatography system to the CO2-based chromatography system and from the CO2-based chromatography system to the liquid chromatography system by preventing leaking and facilitating venting of pressurized fluid.

\* \* \* \* \*